United States Patent
Bespalov et al.

(10) Patent No.: US 7,940,050 B2
(45) Date of Patent: May 10, 2011

(54) SYSTEM AND METHOD FOR MEASURING RESISTIVITY OF AN EARTH FORMATION WITH CORRECTION FOR MUD ELECTRICAL PROPERTIES

(75) Inventors: Alexandre N. Bespalov, Spring, TX (US); Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 309 days.

(21) Appl. No.: 12/190,828

(22) Filed: Aug. 13, 2008

(65) Prior Publication Data

US 2010/0039115 A1 Feb. 18, 2010

(51) Int. Cl.
*G01V 3/00* (2006.01)
*G01V 3/02* (2006.01)

(52) U.S. Cl. ........................................ 324/357; 324/347
(58) Field of Classification Search .................. 324/357, 324/347
See application file for complete search history.

(56) References Cited

U.S. PATENT DOCUMENTS
7,394,258 B2 * 7/2008 Itskovich et al. ............. 324/357

OTHER PUBLICATIONS

P.E. Berger, et al. "FE-MWD Logging in a Different Environment Induced by Drilling With a Rotary Steerable System". SPE 56451. SPE Annual Technical Conference and Exhibition held in Houston, Texas Oct. 3-6, 1999. pp. 1-14.

A.G. Mezzatesta, et al. "Integrated Interpretation of Galvanic and Induction Measurements by Inversion Methods". SPE 29839. SPE Middle East Oil Show held in Bahrain, Mar. 11-14, 1995. pp. 597-605.

A.G. Mezzatesta, et al. "Simultaneous Inversion of Galvanic and Induction Logging Measurements to Improve Resolution". SPE 26976. Latin American/Caribbean Petroleum Engineering Conference held in Buenos Aires, Argentina, Apr. 27-29, 1994. pp. 1059-1074.

J.F. Hunka, et al. "A New Resistivity Measurement System for Deep Formation Imaging and High-Resolution Formation Evaluation". SPE 20559. 65th Annual Technical Conference and Exhibition of the Society of Petroleum Engineers held in New Orleans, LA, Sep. 23-26, 1990.

A.G. Brooks, et al. "Calculation of MWD Electromagnetic Resistivity Tool Response by a Finite-Element Method". SPE 19623. 64th Annual Technical Conference and Exhibition of the Society of Petroleum Engineers held in San Antonio, TX, Oct. 8-11, 1989.

* cited by examiner

*Primary Examiner* — Reena Aurora
(74) *Attorney, Agent, or Firm* — Cantor Colburn LLP

(57) ABSTRACT

A method for measuring a resistivity parameter of an earth formation is provided. The method includes: conveying a measurement current from at least one measurement electrode into the formation, the at least one measurement electrode having a potential; receiving the measurement current by at least one return electrode; and estimating a resistivity parameter from a measurement value selected from at least one of the measurement current and the potential, the resistivity parameter based on (i) an impedance calculated from the measurement value and (ii) a correction factor calculated from a plurality of measurement values related to a conductivity of a fluid in a borehole and a dielectric constant of the fluid in the borehole. A system for measuring a resistivity parameter of an earth formation is also provided.

20 Claims, 11 Drawing Sheets

SYSTEM AND METHOD FOR MEASURING RESISTIVITY OF AN EARTH FORMATION WITH CORRECTION FOR MUD ELECTRICAL PROPERTIES

BACKGROUND

Various formation evaluation (FE) tools are used in hydrocarbon exploration and production to measure properties of geologic formations during or shortly after the excavation of a borehole. The properties are measured by formation evaluation tools and other suitable devices, which are typically integrated into a bottom hole assembly (BHA).

FE tools include various types of sensors, such as resistivity sensors, which measure formation resistivity by passing an electrical current through a formation and measuring a change in the current through the formation. This may be accomplished by physically coupling a measurement electrode and a return or ground electrode to the formation, emitting a current into the formation between the measurement and ground electrodes, and measuring electrical potential differences between the electrodes. The resulting voltage/current (V/I) ratios are converted to apparent resistivities, using algorithms based upon the electrode array geometries and potential theory. Alternatively, the electrodes are capacitively coupled to the formation. In other alternatives, a transmitting antenna inductively couples current to the formation, which is in turn received by the same or a separate antenna.

One type of resistivity sensor is a galvanic resistivity sensor, which is galvanically coupled directly to the earth formation with its electrodes. Galvanic resistivity logs are useful, for example, for characterizing stratigraphy, making correlations between wells and inferring formation porosity.

Resistivity sensors produce images of formation resistivity that can be compromised by parasitic factors such as tool standoff, i.e., the distance between the FE tool and a borehole wall, and electronic phase systematic error.

SUMMARY

Disclosed herein is a method of measuring a resistivity parameter of an earth formation. The method includes: conveying a measurement current from at least one measurement electrode into the formation, the at least one measurement electrode having a potential; receiving the measurement current by at least one return electrode; and estimating a resistivity parameter from a measurement value selected from at least one of the measurement current and the potential, the resistivity parameter based on (i) an impedance calculated from the measurement value and (ii) a correction factor calculated from a plurality of measurement values related to a conductivity of a fluid in a borehole and a dielectric constant of the fluid in the borehole.

Also disclosed herein is a system for measuring a resistivity parameter of an earth formation. The system includes: at least one measurement electrode configured to convey a measurement current into the formation, the at least one measurement electrode having a potential; at least one return electrode configured to receive the measurement current; and a processor configured to estimate the resistivity parameter based on (i) an impedance calculated from at least one of the measurement current and the potential, and (ii) a correction factor calculated from a plurality of measurement currents and the potentials related to a conductivity of a fluid in the borehole and a dielectric constant of the fluid in the borehole.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
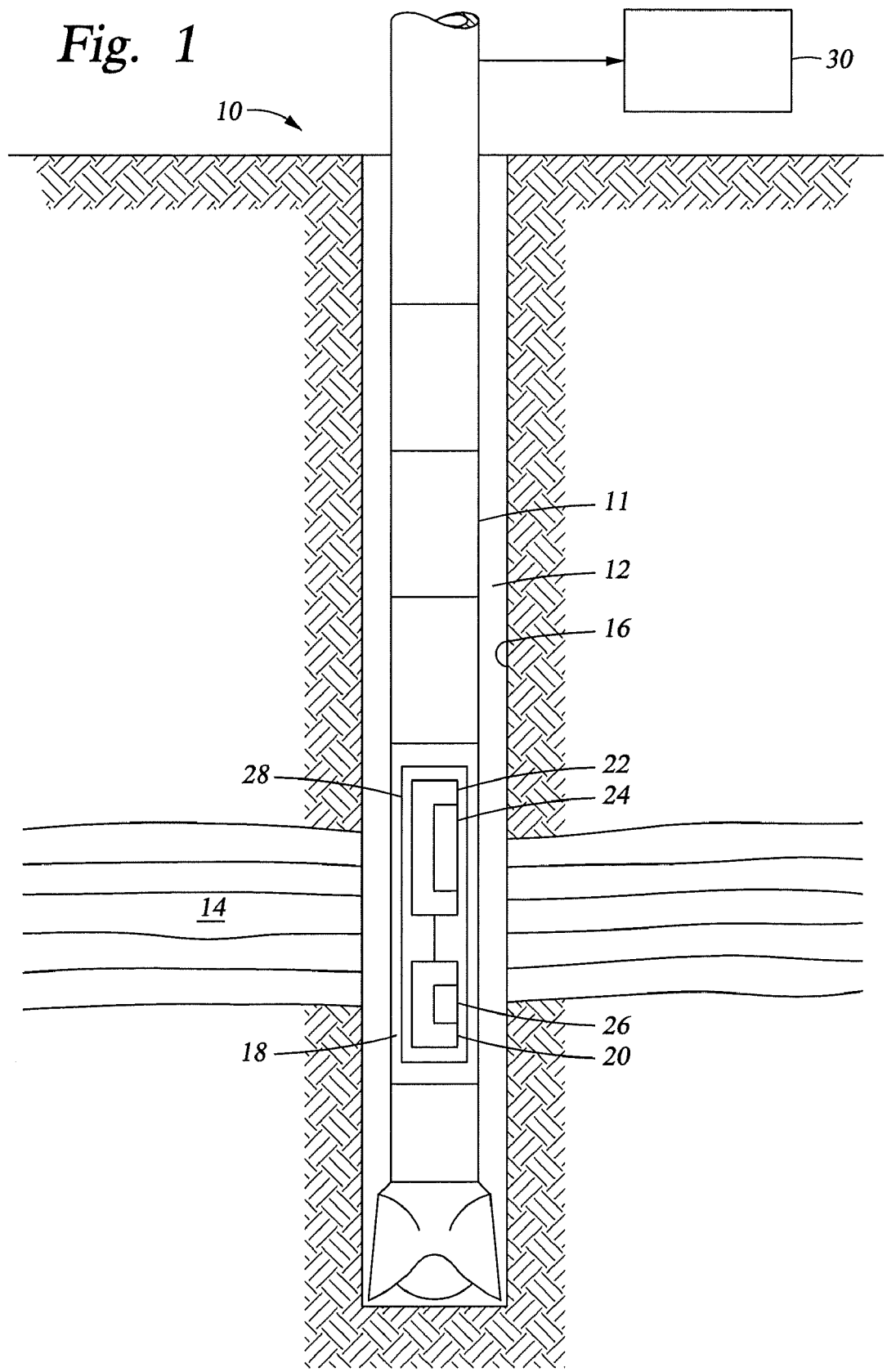
FIG. 1 depicts an exemplary embodiment of a logging system.

Referring to FIG. 1, an exemplary embodiment of a well logging system 10 includes a drillstring 11 that is shown disposed in a borehole 12 that penetrates at least one earth formation 14 for making measurements of properties of the formation 14 and/or the borehole 12 downhole. Drilling fluid, or drilling mud 16 may be pumped through the borehole 12. As described herein, "borehole" or "wellbore" refers to a single hole that makes up all or part of a drilled well. As described herein, "formations" refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area).

As described herein, "logging" refers to the taking of formation property measurements. Examples of logging processes include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging.

As referred to herein, "downhole" or "down a borehole" refers to a location in a borehole away from a surface location at which the borehole begins.

A formation evaluation (FE) downhole tool 18 may be disposed in the well logging system 10 at or near the downhole portion of the drillstring 11, and includes one or more of various types of sensors or receivers 20 to measure various properties of the formation 14 as the tool 18 is lowered down the borehole 12. Such sensors 20 include, for example, nuclear magnetic resonance (NMR) sensors, resistivity sensors, porosity sensors, gamma ray sensors, seismic receivers and others.

In one embodiment, the tool 18 is inserted in the drillstring 11, and allowed to fall by gravity to a downhole position, or is pumped to the downhole position via the mud 16. In other embodiments, the tool 18 is lowered by a wireline, inserted during a MWD or LWD process, or inserted downhole by any other suitable processes.

In one embodiment, the tool 18 includes a communications assembly 22 for transmitting data and communication signals between the tool 18 and a remote processor. The communications assembly 22 includes at least one transmission device 24, including e.g. any number of transmitting and/or receiving antennas, connected to the sensor 20. In one embodiment, the tool 18 includes an electronics unit 26 for receiving data from and/or control of the tool 18. The electronics unit 26 may also control the communications assembly 22. The sensor 20, the communications assembly 22 and/or the electronics unit may be included in a common housing 28. With respect to the teachings herein, the housing 28 may represent any structure used to support at least one of the sensor 20, the communications assembly 22, and the electronics unit 26.

The tool 18 may be operably connected to a surface processing unit 30, which may act to control the sensor 20, and may also collect and process data generated by the sensor 20 during a logging process. In one embodiment, the surface processing unit 30, includes any number of transmitting and/or receiving antennas (not shown) to receive signals from, and/or send signals to, the communications assembly 22. In one embodiment, the surface processing unit 30 is connected to the tool 18 and the sensor 20 via wireline or other physical connection.

The surface processing unit 30 may also include components as necessary to provide for processing of data from the tool 18. Exemplary components include, without limitation, at least one processor, storage, memory, input devices, output devices and the like. As these components are known to those skilled in the art, these are not depicted in any detail herein.

Although the present embodiment provides the surface processing unit 30 to receive and process the frequency data, any number or types of processors, circuits or devices for controlling operation of the tool, processing data and/or communicating with the communications assembly 22 may be provided. Such devices may include any suitable components, such as storage, memory, input devices, output devices and others.

Figure 2:
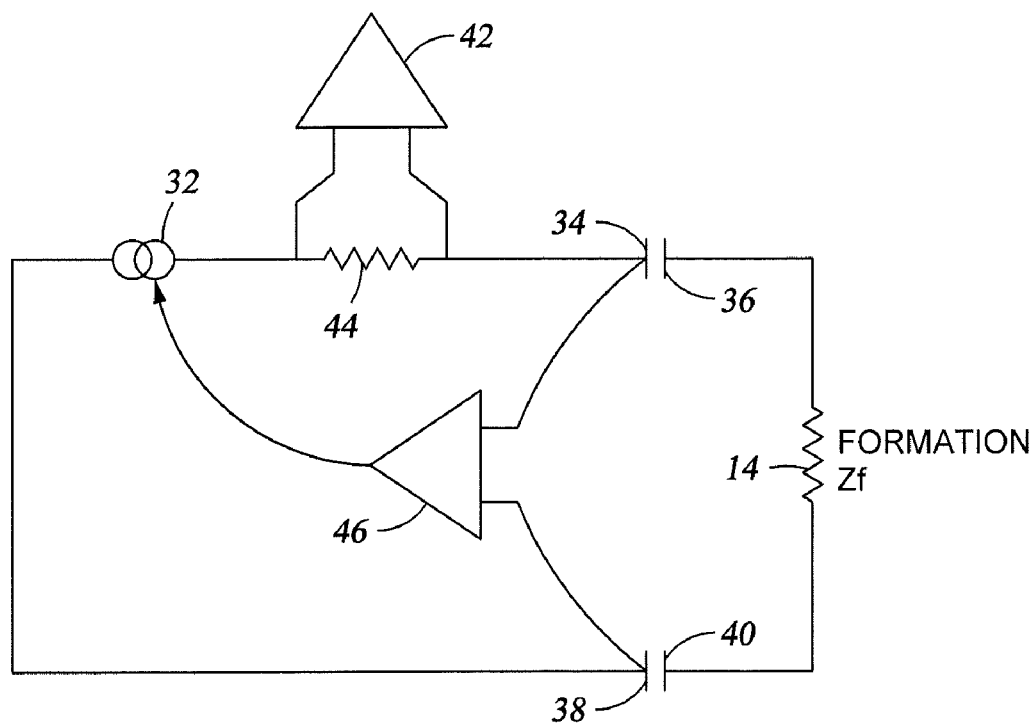
FIG. 2 depicts a circuit diagram of an exemplary embodiment of a logging tool of FIG. 1.

Referring to FIG. 2, a circuit diagram showing the principles of operation of the tool 18 is shown. An electric power source 32 produces an electrical current that is applied to one or more measurement electrodes 34. A capacitor 36 represents a capacitive coupling between the measurement electrode 34 and the formation 14, which has a corresponding impedance "Z". Electrical current coupled to the formation 14 flows through the formation 14 and returns to the tool 18 via a return electrode 38 capacitively coupled to the formation 14, as represented by a return capacitor 40. The tool 18 includes a device to measure the current through the measurement electrode 34, such as a measurement circuit 42 that measures a voltage drop across a resistor 44. Any suitable device or technique for measuring current may be used. A voltage detector 46 measures the voltage difference between the measurement electrode 34 and the return electrode 38 and controls the current at the current generator to maintain a constant voltage. In this case, the output of the current measuring circuit 42 serves as a measurement signal. In another embodiment, the output of the current measuring circuit 42 is used to maintain a constant current and the output of the voltage detector 46 is used as a measurement signal. In other embodiments, both the voltage detected by the voltage detector 46 and the current measured by the current measuring circuit 42 are used as measure signals.

Figure 3:
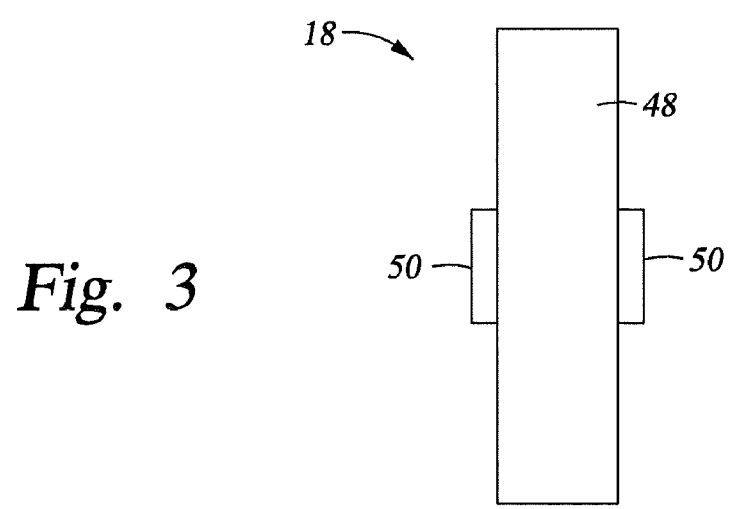
FIG. 3 depicts a side view of an exemplary embodiment of a logging tool of FIG. 1.
Figure 4:
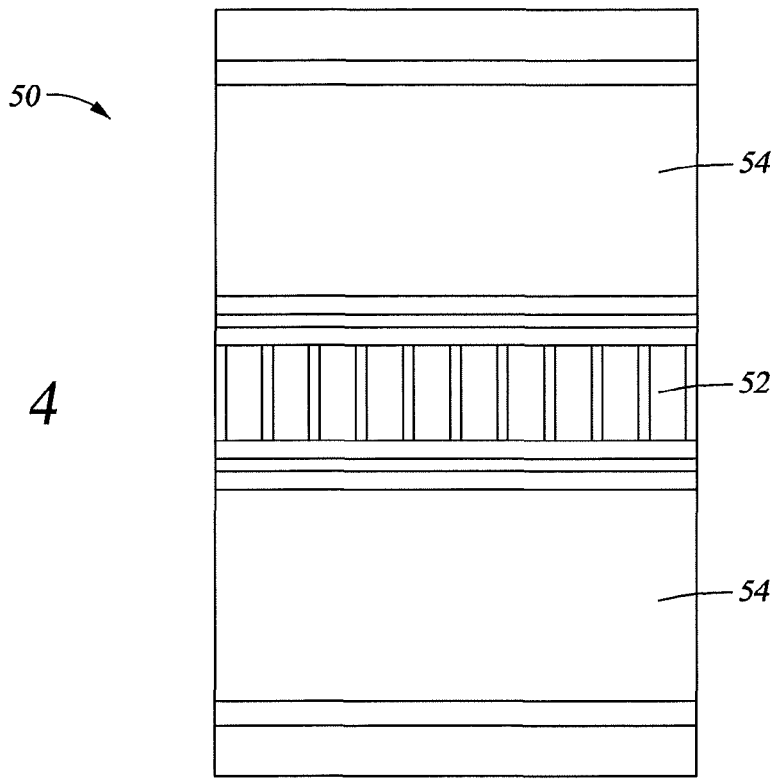
FIG. 4 depicts a side view of an exemplary embodiment of an imager pad of the logging tool of FIG. 3.

Referring to FIGS. 3 and 4, an embodiment of the tool 18 is shown. The tool 18 in this embodiment is a resistivity imaging tool that includes a tool body 48 and at least one formation imager pad 50. The imager pad 50 includes a plurality of capacitative azimuthally and/or vertically displaced buttons 52 for receiving a measurement current, and a plurality of transmitters 54 for inducing a current in the formation 14. In one embodiment, each transmitter 54 acts as a measurement electrode to induce a current in the formation 14, and each button 52 acts as a return electrode to receive a current from the formation 14. On or more of the buttons 52, in one embodiment, are configured to emit a focusing current into the formation 14. In use, the pad 50 is moved along the borehole 12. The electrode buttons 52 may be voltage or current electrodes, and the imager pad 50 may be conductive or non-conductive. In one embodiment, the imager pad 50 is configured to take single-frequency, phase-sensitive measurements. In another embodiment, the imager pad 50 is a high frequency two-terminal galvanic imager.

As used herein, the "vertical" direction refers to a direction generally parallel to the longest axis of the borehole or tool body. The "radial" direction refers to a direction perpendicular to the axial direction and extending from the center to the periphery of the elongated body. The "azimuthal" direction refers to a direction corresponding to a straight line that is perpendicular to the axial direction and perpendicular to the radial direction.

The tool 18 includes any number of components, such as circuitry for measuring voltage and current and/or calculating resistivity parameters. In one embodiment, the tool 18 includes an extension or other device for controlling the standoff of the pad 50. Other components include sensors or other devices for locating the tool 18 or for measuring other aspects of the formation.

The numbers and positions of pads 50 are exemplary, as any numbers and positions of pads 50 may be used. Likewise, although the tool 18 described herein is generally cylindrical, the tool 18 may be any desired shape and size. Furthermore, the numbers and positions of the buttons 52 and the transmitters 54 described herein are exemplary and not limited.

Figure 5:
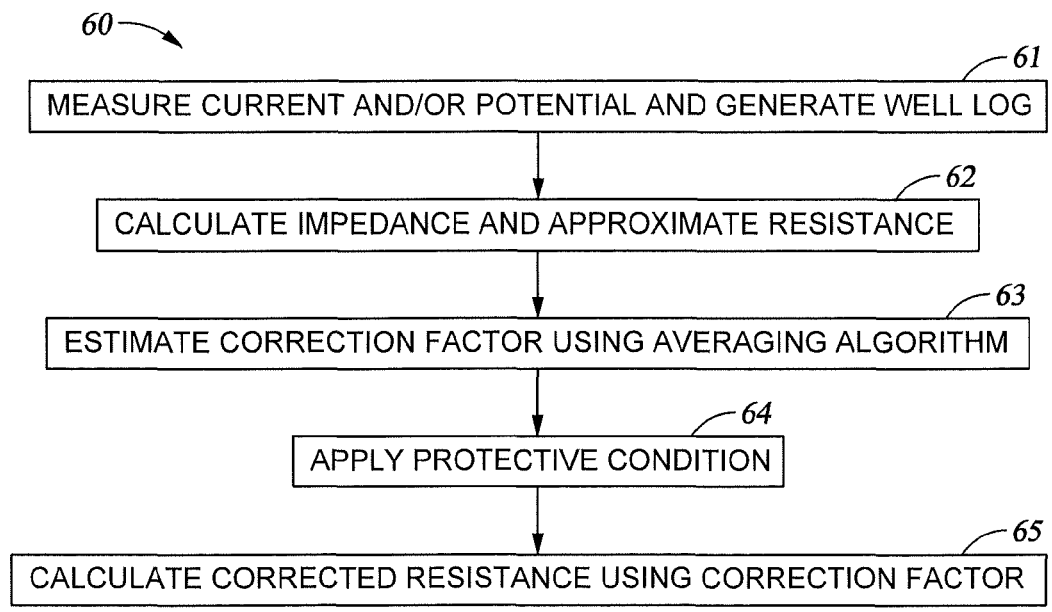
FIG. 5 is a flowchart depicting an exemplary embodiment of a method of measuring a resistivity parameter of an earth formation.

FIG. 5 illustrates a method 60 for measuring a resistivity parameter of the formation 14. The method includes estimating a resistivity parameter based on (i) an impedance calculated from at least one of a measurement current change and an electric potential change between a measurement electrode and a return electrode, and (II) a correction factor calculated from a plurality of measurement current changes and the potential changes related to a conductivity of a fluid in the borehole 12, e.g., the mud 16, and a dielectric constant of the fluid in the borehole 12.

The method 60 includes one or more stages 61-65. The method 60 is described herein in conjunction with the sensor 20, although the method 60 may be performed in conjunction with any number and configuration of receivers, sensors, processors or other measurement tools. In one embodiment, the method 60 includes the execution of all of stages 61-65 in the order described. However, certain stages may be omitted, stages may be added, or the order of the stages changed. Furthermore, the method 60 may be performed in conjunction with wireline measurement processes, LWD or MWD processes, and any other suitable seismic measurement or other logging processes.

In the first stage 61, a current is applied to the formation 14 via at least one measurement electrode, e.g., the transmitters 54, and received via at least one return electrode, e.g., the buttons 52, and a voltage and/or current change associated with each button 52 is recorded for one or more borehole positions. In one embodiment, the voltage and/or current change is measured at each of a plurality of wellbore positions or depths, and a well log is generated. In one embodiment, the measurements are single-frequency, phase sensitive measurements. Sets of data correspond to different tool positions in a logging window and/or different azimuthally displaced buttons at the fixed logging depth.

In one embodiment, a plurality of data points is taken for each depth location. Each data point is represented by one of the azimuthally or vertically displaced buttons 52.

In the second stage 62, an impedance value is calculated from the voltage and/or current, and an approximate formation resistance and/or resistivity is calculated.

As shown in equation [1], neglecting dielectric effect in the formation 14, a complex impedance "Z" measured by the imager pad 50 can be approximately represented in the form:

$$Z = R_f + ReZ_G + iImZ_G, \quad (1)$$

where "$R_f$" is an active (real-valued) formation resistance, and "$Z_G$" is the complex impedance of the standoff between the pad 50 and the borehole wall. The aim of the measurement is formation resistivity "$R_f$", while $Z_G$ is considered as a parasitic term. Whereas the imaginary part of the gap impedance "$iImZ_G$" is filtered out by the phase-sensitive measurements, the correction for the residual term "$ReZ_G$" is needed.

The relationship between the real and imaginary part of the gap impedance is represented as:

$$ReZ_G = \alpha ImZ_G,$$

where the coefficient "$\alpha$" is a correction factor that depends on the electrical parameters of the mud 16 or other fluid in the wellbore 12:

$$\alpha = (\rho_m \omega \in_m \in_0)^{-1},$$

where $\rho_m$ and $\in_m$ are the resistivity and the permittivity of the mud 16, $\omega = 2\pi \cdot$frequency, and $\in_0$ is the dielectric constant. If a value of the coefficient $\alpha$ is known, then the correction can be done by the formula:

$$R_f = ReZ - \alpha ImZ. \quad (2)$$

In the third stage 63, the correction factor $\alpha$ is estimated. For convenience, the real and the imaginary part of the impedance Z is represented by A and B respectively:

$$Z = A + iB.$$

Taking into account Equation (2) described above, the following relationship is derived:

$$R_f + \alpha B = A.$$

For example, for a set of two impedance signals "$Z^{(1)}$" and "$Z^{(2)}$", corresponding to measurements taken from two vertically or azimuthally adjacent buttons 52, the following relationships can be derived:

$$R_f^{(1)} + \alpha B^{(1)} = A^{(1)}, \quad R_f^{(2)} + \alpha B^{(2)} = A^{(2)}. \quad (3)$$

"$B^{(1)}$" and "$B^{(2)}$" are the imaginary parts of the impedances $Z^{(1)}$ and $Z^{(2)}$ respectively, "$A^{(1)}$" and "$A^{(2)}$" are the real parts of the impedances $Z^{(1)}$ and $Z^{(2)}$ respectively, and "$R_f^{(1)}$" and "$R_f^{(2)}$" are the formation resistances corresponding to the impedances $Z^{(1)}$ and $Z^{(2)}$ respectively. It follows from the equations (3) that the following equality holds:

$$\alpha + \frac{R_f^{(1)} - R_f^{(2)}}{B^{(1)} - B^{(2)}} = \frac{A^{(1)} - A^{(2)}}{B^{(1)} - B^{(2)}}. \quad (4)$$

In one embodiment, the data set includes a plurality of data pairs, shown herein as an extended set of "N" adjacent "signal pairs":

$$(Z_1^{(1)}, Z_1^{(2)}), (Z_2^{(1)}, Z_2^{(2)}), \ldots, (Z_N^{(1)}, Z_N^{(2)}), \quad (5)$$

where in one embodiment, N is a great number and all the pairs are taken from a small portion of a well log. These two requirements do not contradict each other as the vertical image sampling step may be small, and that the buttons 52 may include fractional buttons such as tenths of the buttons 52 placed azimuthally. Note that the same Z may participate at several signal pairs.

In one embodiment, the following assumptions are utilized to derive the correction factor estimation algorithm. The first assumption is that the coefficient $\alpha$ is the same for all the pairs, i.e., the mud 16 is homogeneous within the considered part of the wellbore 12. The second assumption is that variation of the formation resistance $R_f$ is not correlated with variation of the imaginary part of the impedance B caused by variable standoff and/or borehole rugosity.

In one embodiment, Equation (4) is averaged over the entire data set. According to the second assumption, the second term at the left-hand side of Equation (4) is a random with zero mean, i.e., its probability to be positive or negative for a pair is equal. Thus, the averaging decreases its relative contribution into the left-hand side of Equation (4) as $1/\sqrt{N}$. In addition, one can expect that for the adjacent points the absolute values $R_f^{(1)} - R_f^{(2)}$ are small, at least for the majority of the pairs. Accordingly, the averaging can be represented by the following estimated value:

$$\alpha \approx \left\langle \frac{A_j^{(1)} - A_j^{(2)}}{B_j^{(1)} - B_j^{(2)}} \right\rangle_{averaged\ somehow\ for\ j=1,\ \ldots,\ N} \quad (6)$$

In one embodiment, a concrete averaging algorithm is selected, such as a weighted average. In one embodiment, the weight applied for each pair "j" is:

$$(B_j^{(1)} - B_j^{(2)})^2.$$

This averaging weight results in the following averaging equation:

$$\alpha := \frac{\sum_{j=1}^{N}(A_j^{(1)} - A_j^{(2)})(B_j^{(1)} - B_j^{(2)})}{\sum_{j=1}^{N}(B_j^{(1)} - B_j^{(2)})^2}. \quad (7)$$

It can be seen that correction with this value of α is in fact the orthogonalization of a vector $\{A_j^{(1)}-A_j^{(2)}\}_{j=1}^{N}$ to a vector $\{B_j^{(1)}-B_j^{(2)}\}_{j=1}^{N}$, so the "energy" of the corrected signal is minimized:

$$\sum_{j=1}^{N}(R_{f,j}^{(1)} - R_{f,j}^{(2)})^2 = \min. \tag{8}$$

In the fourth stage 64, a "protective" condition is applied to the correction factor to reduce errors in the algorithm. The value of α calculated by the above algorithm may contain some statistical and systematic error. To reduce algorithmic error amplification, the following "protective" condition is imposed:

$$ReZ - \alpha ImZ \geq \delta ReZ. \tag{9}$$

Condition (9) does not allow the original signal to be diminished by the correction (2) more than by a factor of 1/δ. To ensure Condition (9), the following step is added to the algorithm (before the correction itself by Formula (2)):
For each logging point:

$$\text{if } ReZ - \alpha ImZ < \delta ReZ \text{ then } \alpha_{updated} := \frac{(1-\delta)ReZ}{ImZ}. \tag{10}$$

In the fifth stage 65, a corrected resistance value is calculated by applying the following formula:

$$R_f = ReZ - \alpha ImZ.$$

FIGS. 6-12 illustrate a variety of examples of application of the method 80 to well logging data. For each of the following examples, the pad of the considered imager of FIG. 4 was used to collected log data. The correction was performed by Equation (2) where the value of α was calculated according to Equation (7). The data set utilized included all pairs of adjacent logging points, i.e., impedance measurements for adjacent buttons 52 at each measurement depth. Condition (9) was enforced by applying the algorithm (10) with parameter δ=0.1.

In all of the following examples, the operational frequency was 10 MHz, and the mud parameters were $\rho_m$=5,000 ohm-meter ("ohmm"), $\in_m$=5. That is, the true value of α is 0.072 in these examples. The borehole diameter was 8.5". As referred to herein, "raw" data or a "raw" signal refers to uncorrected data. Furthermore, a "signal" refers to a collection of data taken over a selected depth range.

Figure 6:
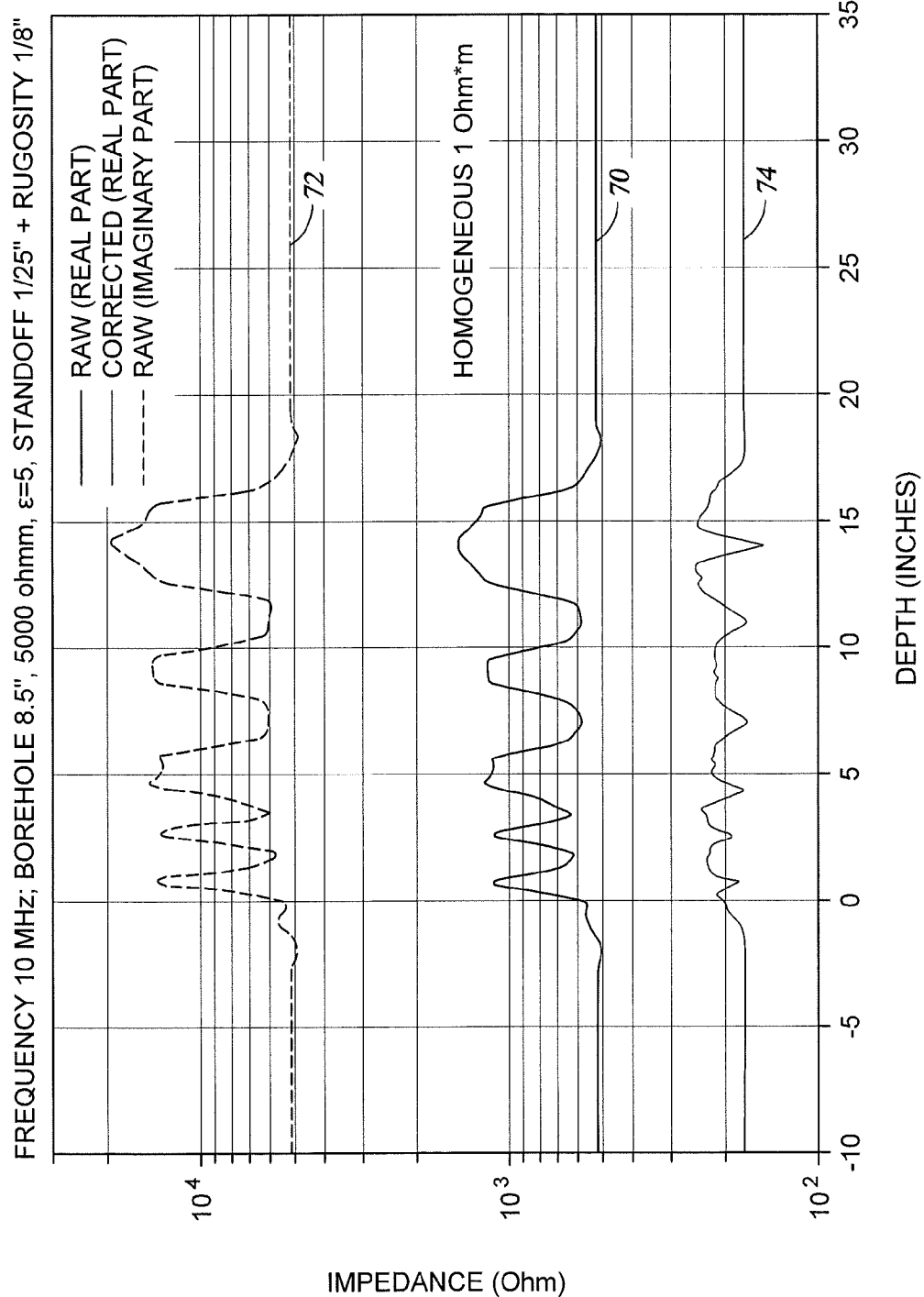
FIG. 6 depicts an example of comparative signal measurements for uncorrected data and data corrected according to the method of FIG. 5.

Referring to FIG. 6, well log data for an 8.5 inch diameter borehole at a standoff of ½s inch and a rugosity of ⅛ inch, crossing homogeneous whole-space, is shown. The data in this example includes a real part 70 and an imaginary part 72 of a raw signal, and a corrected real part signal 74. As shown herein, application of the correction method reduces the undesirable variations by a factor of 2.7.

In this example, the formation is homogeneous, having a resistivity of 1 ohmm and a permittivity of 20. The common pad-formation standoff is ½s", and there are several places where the borehole radius is greater by ⅛" than its basic value 4.25" (rugosity model); the vertical heights of these expanded places are 1", 2", and 3" respectively. The formation resistivity is constant, but as shown in FIG. 6, a raw signal 70 (real part) varies by about 3 times, or 9.5 decibels ("dB"). This variation is purely parasitic, caused by the rugosity. Equation (7) gives α=0.0675, i.e., the discrepancy is about 6%. Application of the protective condition does not result in any updates since the protective criterion is satisfied everywhere for the original value of α (provided by Equation (7)). The corrected signal 74 has the dynamic range of 1.5 (3.5 dB), i.e. in this example the correction reduces the parasitic variation by a factor of 2.7.

Figure 7:
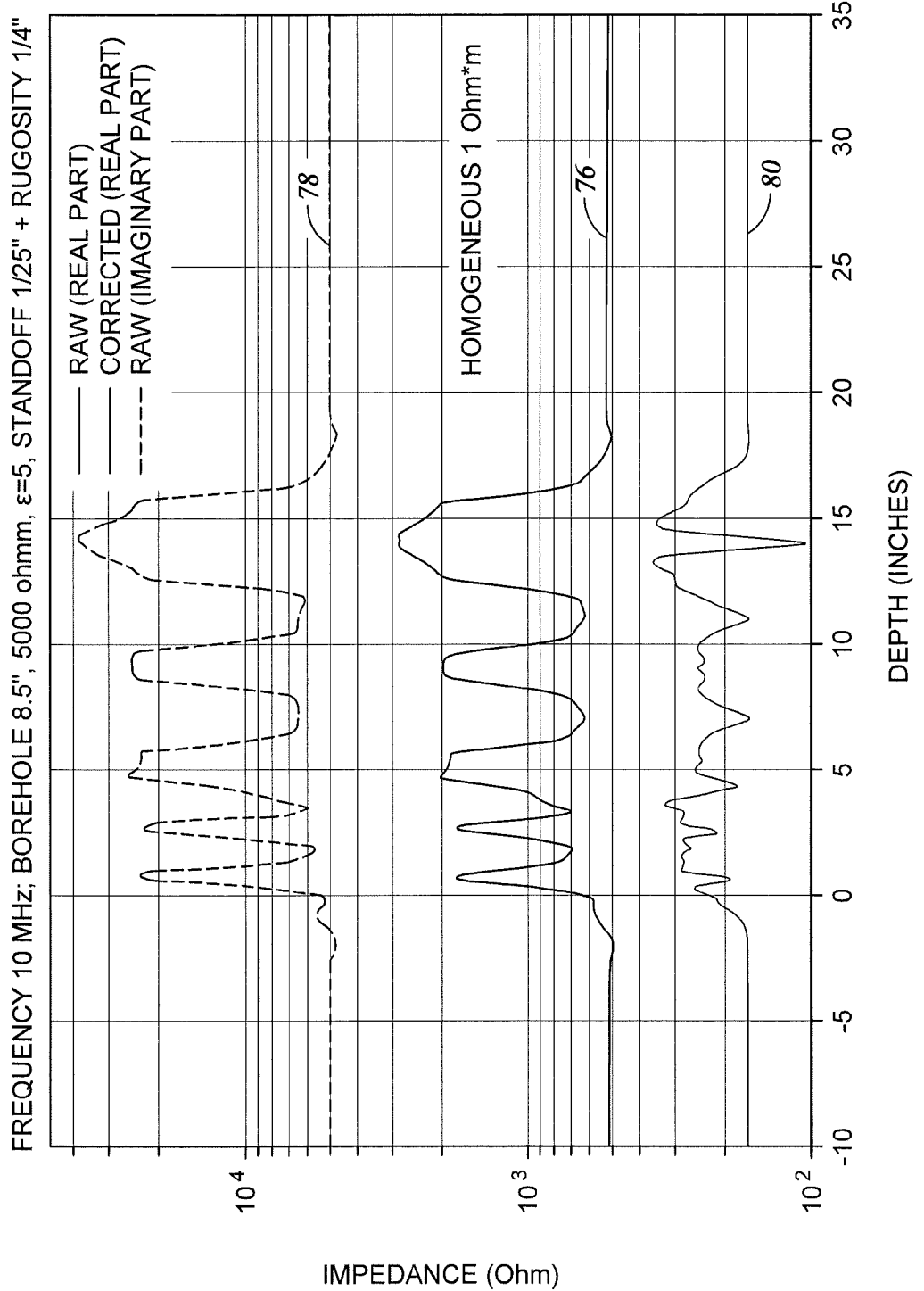
FIG. 7 depicts another example of comparative signal measurements for uncorrected data and data corrected according to the method of FIG. 5.

Referring to FIG. 7, well log data for an 8.5 inch diameter borehole at a standoff of ½s inch and a rugosity of ¼ inch, crossing homogeneous whole-space, is shown. The data in this example includes a real part 76 and an imaginary part 78 of a raw signal, and a corrected real part signal 80. As shown herein, application of the correction method reduces the undesirable variations by a factor of 2.6.

The borehole of FIG. 7 is equivalent to the borehole of FIG. 6, but the rugosity depth is twice as great. The raw signal 76 varies by about 6 times, i.e., 15.6 dB. Equation (7) yields the value α=0.067, i.e., the discrepancy is about 7%, and application of the protective condition does not result in any updates. The corrected signal 80 has the dynamic range of 2 times, i.e., 6 dB, and accordingly the correction reduces the parasitic variation by factor 2.6.

Figure 8:
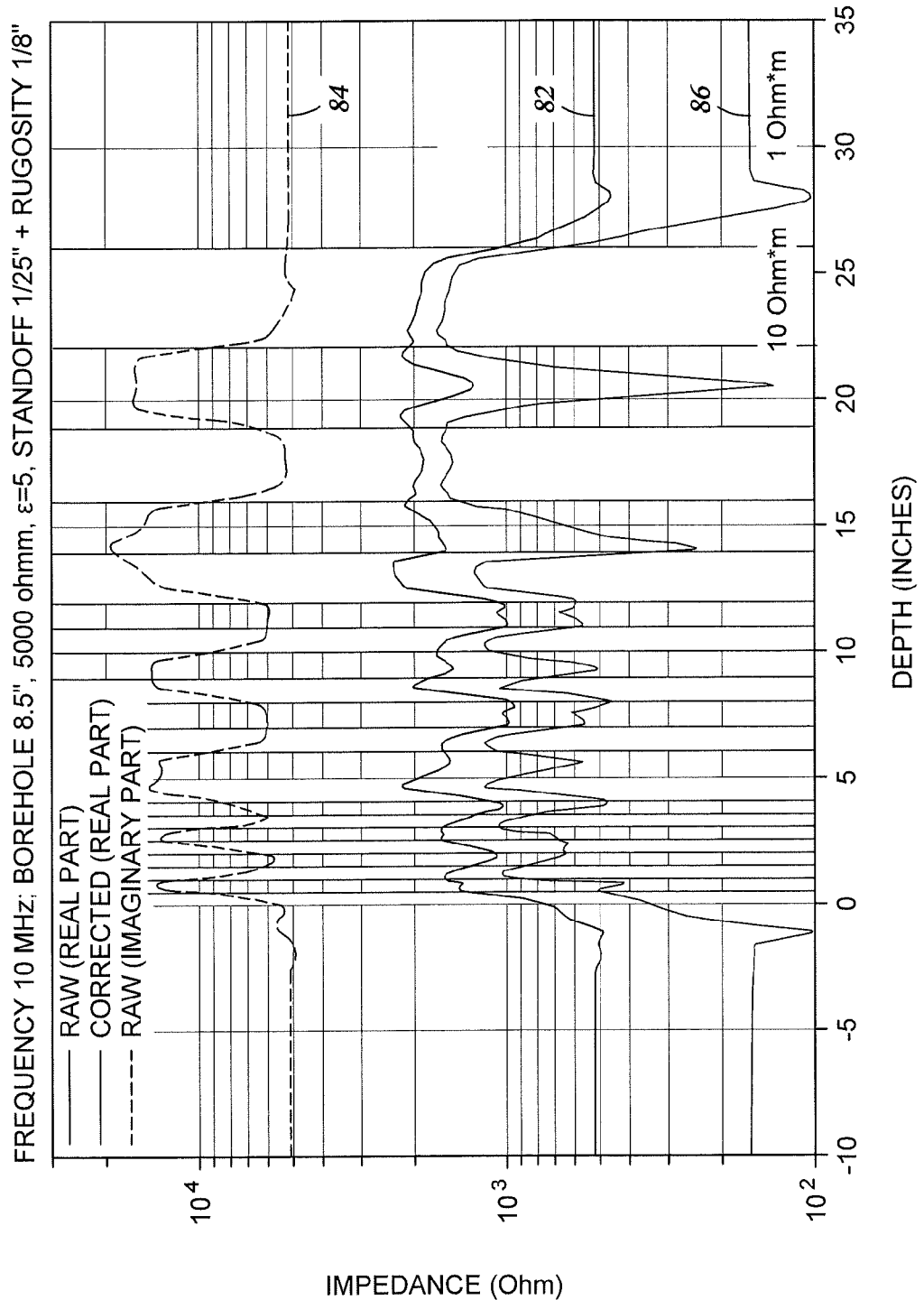
FIG. 8 depicts another example of comparative signal measurements for uncorrected data and data corrected according to the method of FIG. 5.

Referring to FIG. 8, well log data is shown for a 8.5" borehole, with small ⅛" deep rugosity, crossing a layered formation. The data in this example includes a real part 82 and an imaginary part 84 of a raw signal, and a corrected real part signal 86. The corrected signal reflects 86 the true layers, i.e., bedding, resistivity much better than the raw signal 82. The formation consists of twenty-three layers where the first and the last layers are infinite shoulders, with increasing thicknesses. Layers two through nine are each ½" thick, layers ten through seventeen are each 1" thick, layers eighteen and nineteen are each 2" thick, layers twenty and twenty-one are each 3", and layer twenty-two is 4" thick. The odd-numbered layers have a resistivity of 1 ohmm and a permittivity of 20, and the even-numbered layers have a resistivity of 10 ohmm and a permittivity of 10. The common pad-formation standoff is ½s", and layers two, three, six, seven, ten, eleven, fourteen, fifteen, eighteen, nineteen and twenty-one each have an additional standoff of ⅛" (the model of rugosity).

Equation (7) yields here the value α=0.096, i.e. the discrepancy is about 33%, but application of the protective condition updates it to α=0.072, which is almost exact. It can be seen in FIG. 8 that the corrected signal 86 reflects the true bedding resistivity incomparably better than the raw signal 82.

Figure 9:
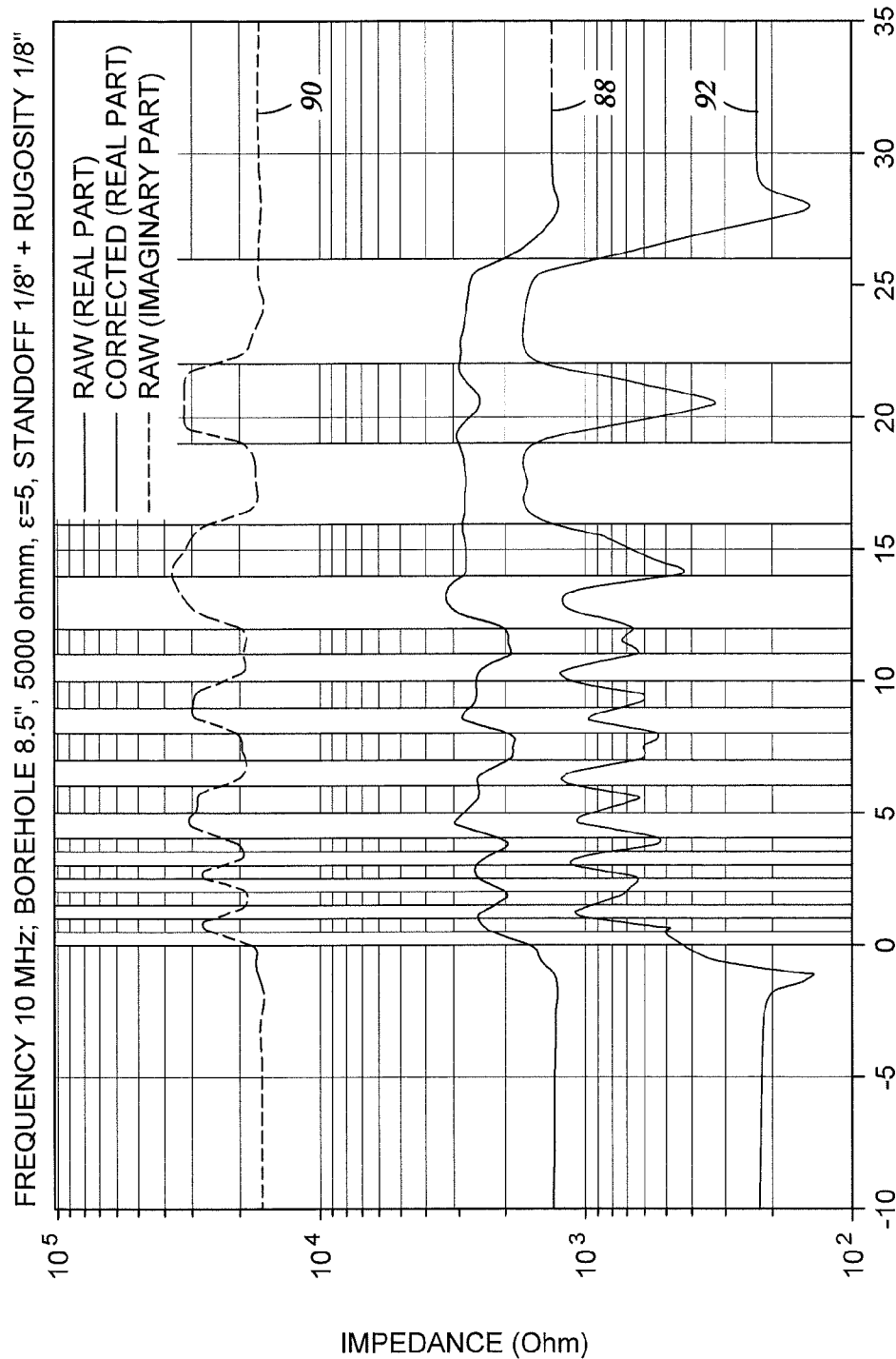
FIG. 9 depicts another example of comparative signal measurements for uncorrected data and data corrected according to the method of FIG. 5.

Referring to FIG. 9, well log data for an 8.5 inch diameter borehole, with a ¼" pad standoff and a small ⅛" deep rugosity, crossing a layered formation, is shown. FIG. 9 is the same as FIG. 8 but the common pad-formation standoff in this example is ⅛". The data in this example includes a real part 88 and an imaginary part 90 of a raw signal, and a corrected real part signal 92. Equation (7) yields the value α=0.069, i.e., the discrepancy is about 4%, and the protective condition updates it to α=0.067, slightly increases the α-discrepancy up to 7%. As shown in FIG. 9, the corrected signal 92 reflects the true bedding resistivity much better than the raw signal 88.

Figure 10:
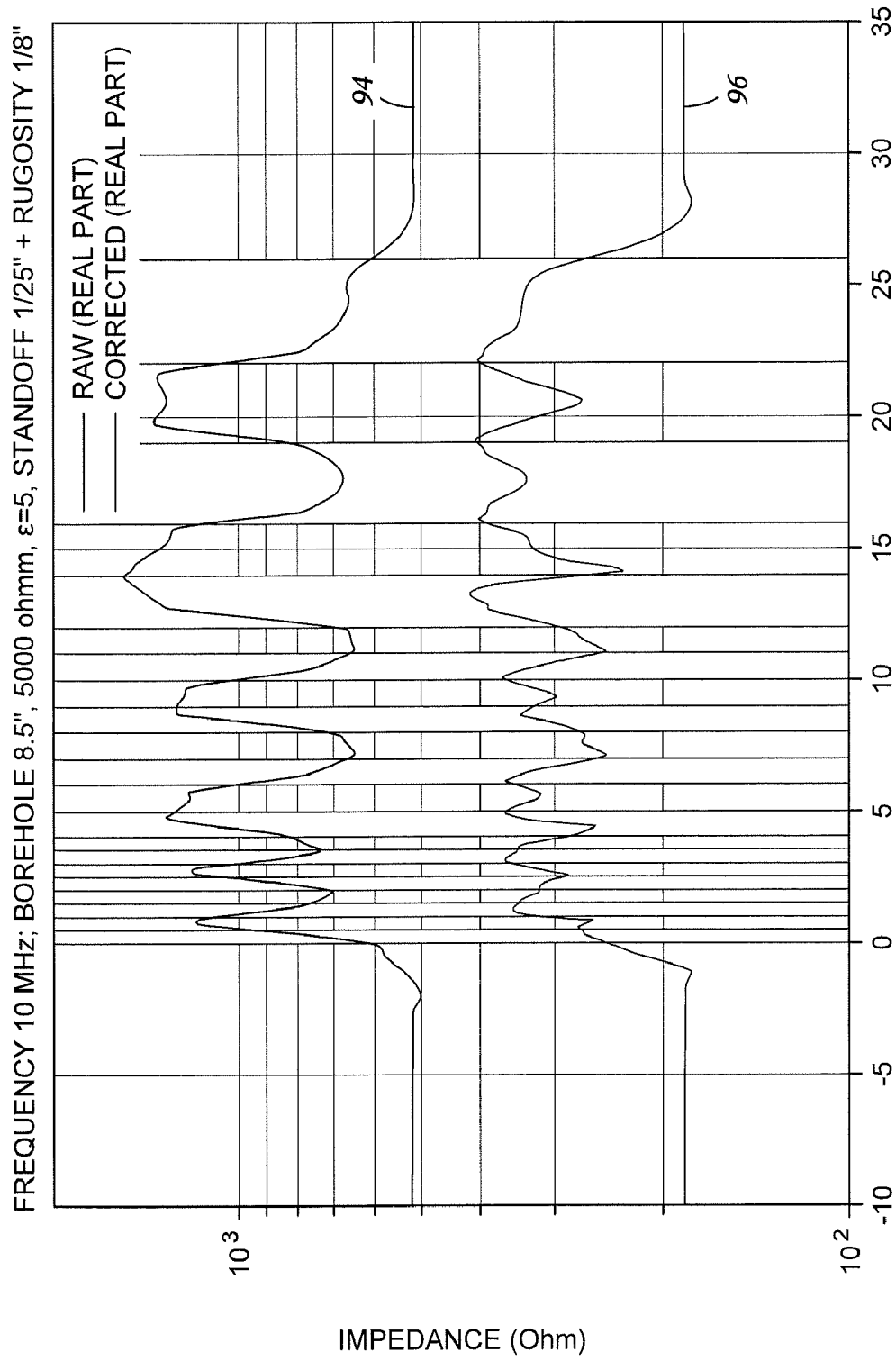
FIG. 10 depicts another example of comparative signal measurements for uncorrected data and data corrected according to the method of FIG. 5.

Referring to FIG. 10, well log data for an 8.5 inch borehole with a ½s" pad standoff and a small ⅛" deep rugosity, crossing a layered formation with small contrast, is shown. The data in this example includes a real part 94 of a raw signal, and a corrected real part signal 96. FIG. 10 is the same as FIG. 8 but the resistivity contrast between formation layers is just 2 (1 ohmm and 2 ohmm). Equation (7) yields the value α=0.065, i.e., the discrepancy is about 10%, and application of the protective condition results in no updates. As shown in FIG. 10, while the raw signal 94 reflects the rugosity only, the corrected signal 96 provides an acceptable image of the formation resistivity.

Figure 11:
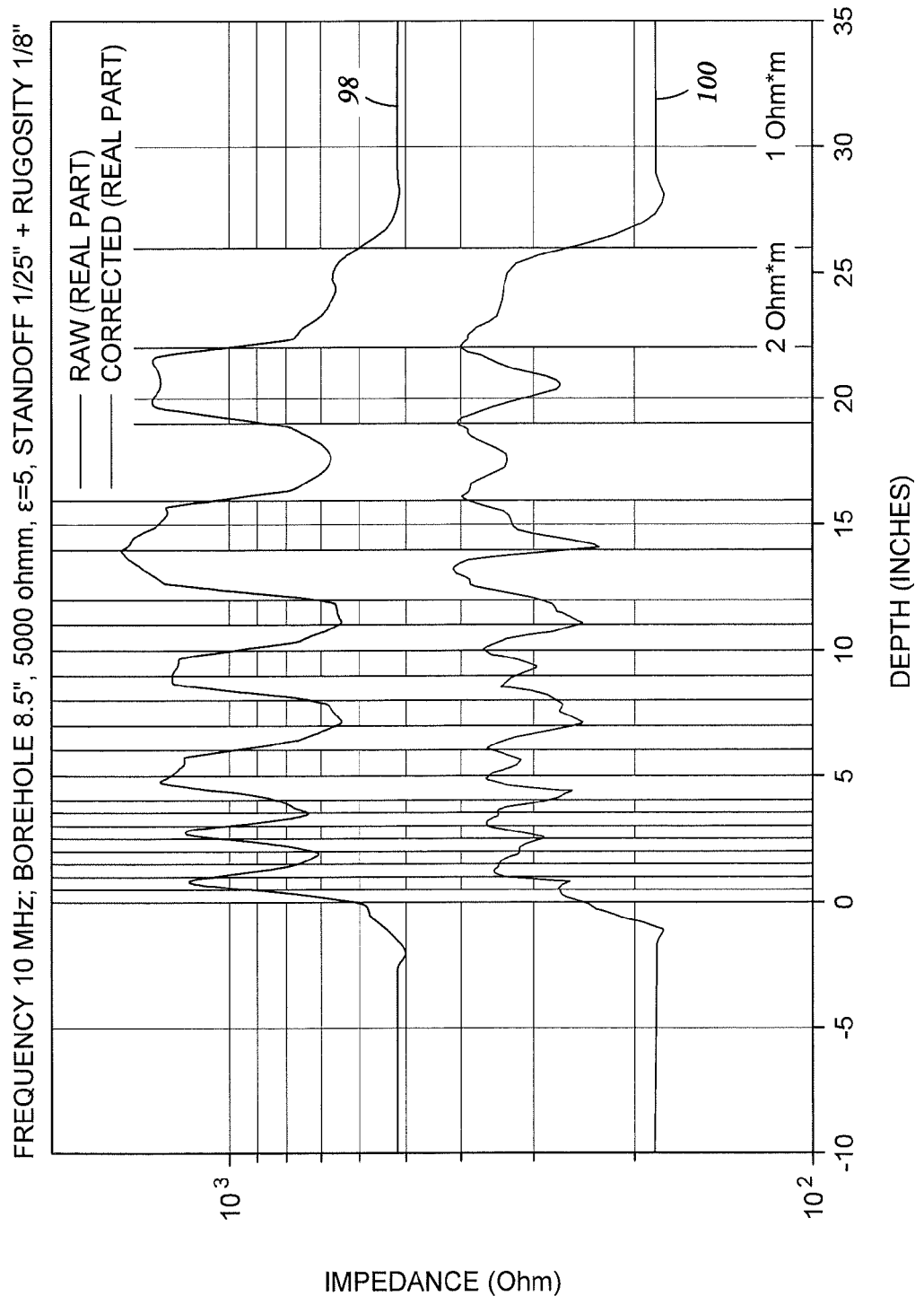
FIG. 11 depicts another example of comparative signal measurements for uncorrected data and data corrected according to the method of FIG. 5.

Referring to FIG. 11, well log data for a 8.5" borehole, with a ½5" pad standoff and a small ⅛" deep uniformly periodic rugosity, crossing a layered formation with small contrast, is shown. The data in this example includes a real part 98 of a raw signal, and a corrected real part signal 100. While the raw signal 98 reflects the rugosity only, the corrected signal 100 provides an acceptable image of the formation resistivity.

It can be seen that the above-stated method 80 filters out the part of the raw signal, Re Z, whose variation directly correlates with variation of the imaginary component ImZ. Because of this, the method 80 can automatically correct contaminations of another origin, but having the same correlation.

In particularly, a similar correlation between variations of real and imaginary components of the parasitic impedance is observed when some phase error "$\beta$" is introduced by electronics. As a result, instead of a true impedance value Z, the tool 18 reads an imperfect impedance $\tilde{Z}=Z(1+i\beta)$, where $\beta$ is an unknown small coefficient, approximately a several percentage points at maximum (so hereafter we neglect all the terms $\sim\beta^2$). The condition that ImZ$\gg\beta$ReZ is also required, otherwise the impact of the phase error is negligible and correction is not needed. Accordingly, Im$\tilde{Z}\approx$ImZ. Thus, the impedance can be represented by the following equation:

$$\tilde{Z}=(R_f+ReZ_G-iImZ_G)(1+i\beta)=R_f+ReZ_G-\beta ImZ_G+ iIm\tilde{Z}==R_f+(\alpha-\beta)ImZ+iIm\tilde{Z}\approx R_f+(\alpha-\beta)Im\tilde{Z}+iIm\tilde{Z}, \quad (11)$$

which results in the following equation:

$$R_f=Re\tilde{Z}-(\alpha-\beta)Im\tilde{Z}. \quad (12)$$

The last formula, Equation (12), coincides with Equation (2), but instead of the $\alpha$-parameter of the mud 16 we have a new parameter $\tilde{\alpha}=\alpha-\beta$, describing the joint impact of both the standoff and the electronic phase error. This suggests that the proposed algorithm may automatically correct for both errors simultaneously and Equation (7) provides an estimate of $\tilde{\alpha}$.

In one embodiment, the electronic phase error can be corrected if it is relatively stable within the data set. A similar requirement may be applied for the mud parameter $\alpha$. Unlike the original mud parameter $\alpha$, the coefficient $\tilde{\alpha}$ can be negative. Furthermore, in another embodiment, different sensor buttons may have different values of $\beta$, thus to correct for the phase error, the data set includes measurements made by one button only.

Figure 12:
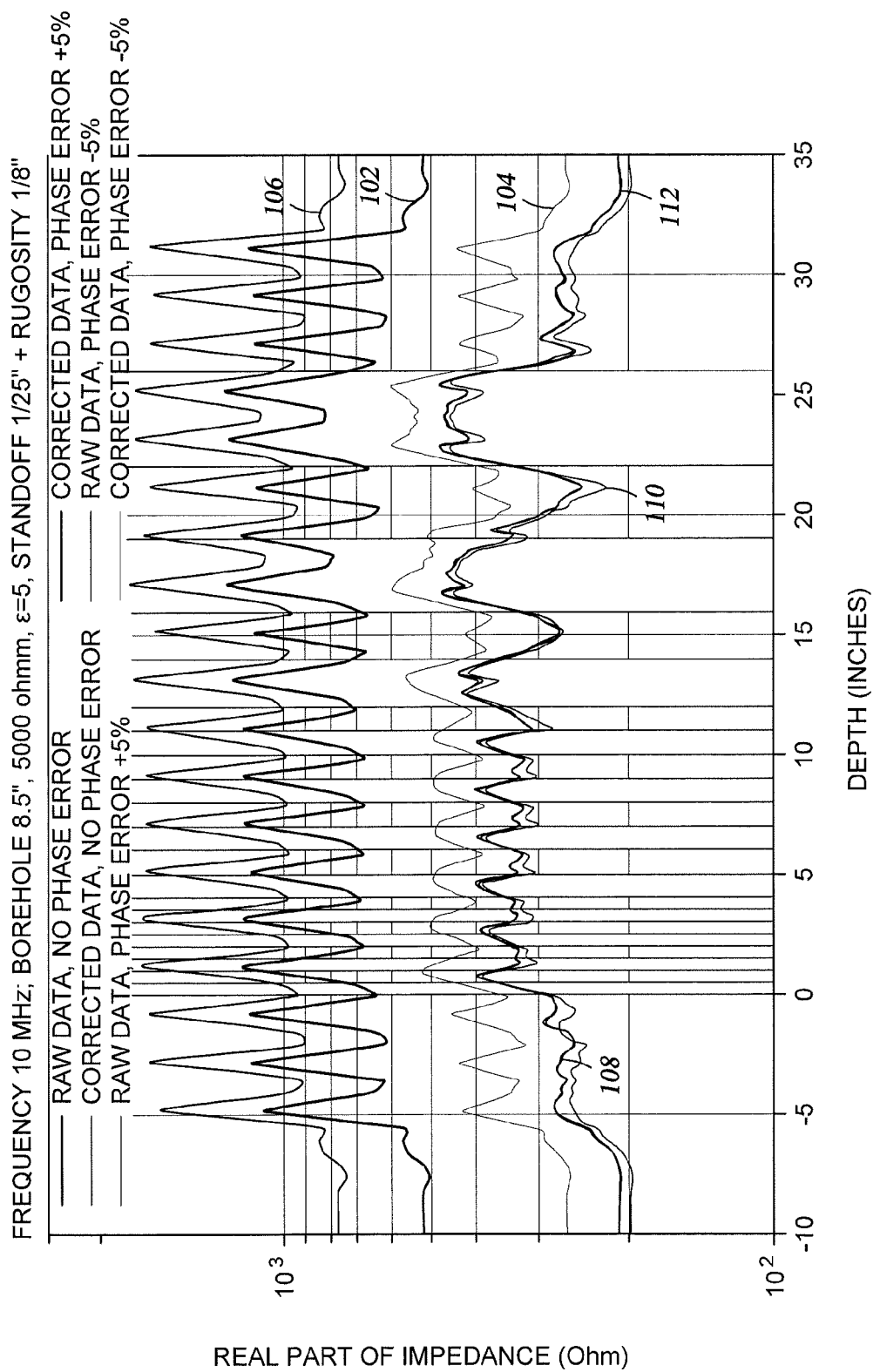
FIG. 12 depicts another example of comparative signal measurements for uncorrected data and data corrected according to the method of FIG. 5.

Referring to FIG. 12, verification of the ability of the method 80 to correct for the electronic phase error $\beta$ is shown. In this example, the synthetic raw data of FIG. 11 were artificially contaminated, and then the same algorithm without any modification or a special care was applied to $\tilde{Z}$. For the phase error $\beta=+0.05$, the algorithm gave $\tilde{\alpha}=0.0133$, while the true value is $\tilde{\alpha}=0.022$, i.e., the discrepancy is about 40%. For $\beta=-0.05$, the algorithm gave $\tilde{\alpha}=0.112$, while the true value is $\tilde{\alpha}=0.122$, i.e., the discrepancy is about 8%. In each instance, the protective condition yielded no updates.

Note that for all three cases—$\beta=0$; +0.05; −0.05—the absolute value of the $\tilde{\alpha}$-discrepancy is the same; it has the high relative value for $\beta=+0.05$ due to the low value of $\tilde{\alpha}$. In this case, the electronic error compensates for 70% of the standoff impact.

The results for these three values of $\beta$ are presented in FIG. 12. The well log in this example includes raw signals 102, 104 and 106, representing signals for zero phase error, +0.05 phase error and −0.05 phase error, respectively. Corrected signals 108, 110 and 112, represent signals for zero phase error, +0.05 phase error and −0.05 phase error, respectively. FIG. 12 demonstrates that, while the raw signals significantly depend on $\beta$ and in all cases are badly contaminated, the corrected signals are almost the same and provide an acceptable image.

Figure 13:
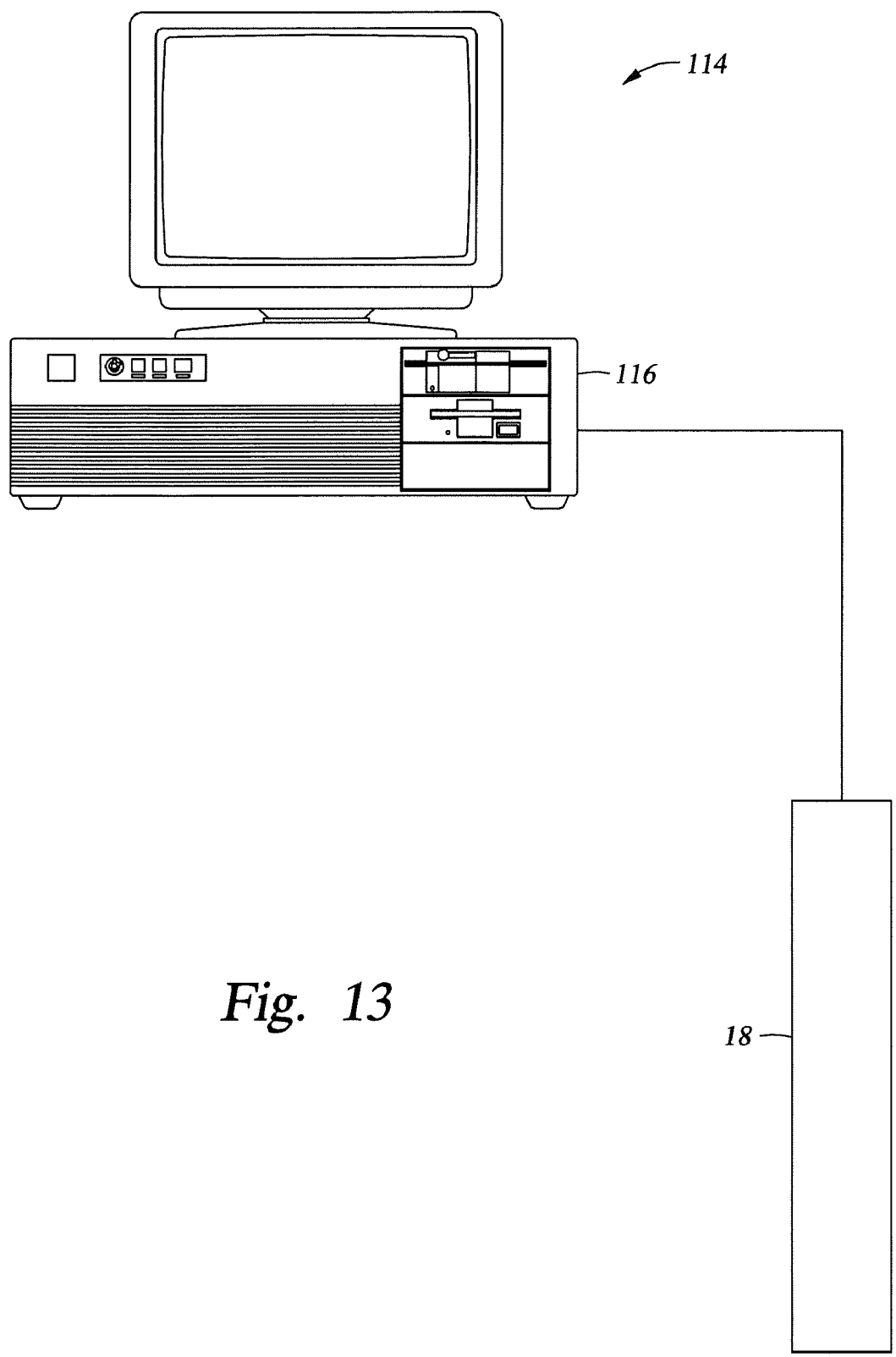
FIG. 13 depicts an exemplary embodiment of a system for measuring a resistivity parameter of an earth formation.

Referring to FIG. 13, there is provided a system 114 for assessing a resistivity parameter of the formation 14. The system may be incorporated in a computer or other processing unit capable of receiving data from the tool. The processing unit may be included with the tool 18 or included as part of the surface processing unit 30. The processing unit is configured to execute the method 80.

In one embodiment, the system 114 includes a computer 116 coupled to the tool 18. Exemplary components include, without limitation, at least one processor, storage, memory, input devices, output devices and the like. As these components are known to those skilled in the art, these are not depicted in any detail herein. The computer 116 may be disposed in at least one of the surface processing unit 30 and the tool 18.

Generally, some of the teachings herein are reduced to an algorithm that is stored on machine-readable media. The algorithm is implemented by the computer 116 and provides operators with desired output.

The systems and methods described herein provide various advantages over existing processing methods and devices. The systems and methods described herein allow for correction for both tool standoff and systematic phase error caused by imperfections of the tool electronics.

The methods and systems described herein require less data and calculations than prior art techniques. For example, prior art techniques involved i) combining the resistivity measurements at two different frequencies, ii) correcting resistivity measurements from a single frequency using a so-called $\alpha$-correction technique, which requires a mud cell to measure a generalized mud parameter $\alpha=(\rho_m\omega\epsilon_m\epsilon_0)^{-1}$ that is used to correct the data for the pad's standoff, and iii) processing resistivity data taken from a plurality of button standoffs. In contrast, the methods and systems described herein utilize analysis of the resistivity data without the need for any additional components, additional measurement data or prior information about the mud's electrical properties.

Furthermore, the methods and systems described herein provide formation resistivity data and images that are substantially or completely unaffected by undesirable parasitic factors like tool standoff and electronic phase systematic error.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the system and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of measuring a resistivity parameter of an earth formation, the method comprising:
   conveying a measurement current from at least one measurement electrode into the formation, the at least one measurement electrode having a potential;
   receiving the measurement current by at least one return electrode; and
   estimating a resistivity parameter from a measurement value selected from at least one of the measurement current and the potential, the resistivity parameter based on (i) an impedance calculated from the measurement value and (ii) a correction factor calculated from a plurality of measurement currents and potentials related to a conductivity of a fluid in a borehole and a dielectric constant of the fluid in the borehole.

2. The method of claim 1, wherein the at least one return electrode includes a plurality of azimuthally displaced return electrodes.

3. The method of claim 1, wherein the at least one measurement electrode is a plurality of vertically displaced measurement electrodes, and the at least one return electrode is a plurality of vertically displaced return electrodes corresponding to the vertically displaced measurement electrodes.

4. The method of claim 1, wherein the at least one return electrode includes a plurality of return electrodes having a combination of vertically and azimuthally displaced return electrodes.

5. The method of claim 1, wherein the correction factor is calculated according to the following equation:

$$\alpha = \left( \frac{A_j^{(1)} - A_j^{(2)}}{B_j^{(1)} - B_j^{(2)}} \right)_{averaged\ somehow\ for\ j=1,\ \ldots\ ,N}$$

wherein $B^{(1)}$ and $B^{(2)}$ are imaginary parts of the impedances of a first and second data point of a data pair "j" respectively, $A^{(1)}$ and $A^{(2)}$ are the real parts of the impedances of the data pair "j", and "N" is a total number of data pairs.

6. The method of claim 5, wherein the correction factor is calculated according to the following equation:

$$\alpha := \frac{\sum_{j=1}^{N}(A_j^{(1)} - A_j^{(2)})(B_j^{(1)} - B_j^{(2)})}{\sum_{j=1}^{N}(B_j^{(1)} - B_j^{(2)})^2}.$$

7. The method of claim 5, wherein the data pairs selected for calculating the correction factor are statistically representative.

8. The method of claim 1, wherein the correction factor corrects for at least one of tool standoff error and systematic electronic phase error.

9. The method of claim 1, wherein the resistivity parameter is estimated according to the following equation:

$$R_f = ReZ - \alpha ImZ,$$

wherein "Re Z" is a real part of the impedance, "Im Z" is an imaginary part of the impedance, and $\alpha$ is the correction factor.

10. The method of claim 1, wherein the at least one return electrode is a plurality of return electrodes, and the correction factor is calculated based on a plurality of measurement value pairs, each measurement pair corresponding to one of a plurality of depths.

11. A system for measuring a resistivity parameter of an earth formation, the system comprising:
    at least one measurement electrode configured to convey a measurement current into the formation, the at least one measurement electrode having a potential;
    at least one return electrode configured to receive the measurement current; and
    a processor configured to estimate the resistivity parameter based on (i) an impedance calculated from at least one of the measurement current and the potential, and (II) a correction factor calculated from a plurality of measurement currents and potentials related to a conductivity of a fluid in the borehole and a dielectric constant of the fluid in the borehole.

12. The system of claim 11, wherein the at least one return electrode includes a plurality of return electrodes selected from at least one of: i) a plurality of azimuthally displaced return electrodes and ii) a plurality of vertically displaced return electrodes.

13. The system of claim 11, wherein the at least one measurement electrode is a plurality of vertically displaced measurement electrodes, and the at least one return electrode is a plurality of vertically displaced return electrodes corresponding to the vertically displaced measurement electrodes.

14. The system of claim 11, wherein processor is configured to calculate the correction factor according to the following equation:

$$\alpha = \left\langle \frac{A_j^{(1)} - A_j^{(2)}}{B_j^{(1)} - B_j^{(2)}} \right\rangle_{\text{averaged somehow for } j=1,\ldots,N}$$

wherein $B^{(1)}$ and $B^{(2)}$ are imaginary parts of the impedances of a first and second data point of a data pair "j" respectively, and $A^{(1)}$ and $A^{(2)}$ are the real parts of the impedances of the data pair "j", and "N" is a total number of data pairs.

15. The system of claim 14, wherein the correction factor is calculated according to the following equation:

$$\alpha := \frac{\sum_{j=1}^{N}(A_j^{(1)} - A_j^{(2)})(B_j^{(1)} - B_j^{(2)})}{\sum_{j=1}^{N}(B_j^{(1)} - B_j^{(2)})^2}.$$

16. The system of claim 14, wherein the data pairs selected for calculating the correction factor are statistically representative.

17. The system of claim 11, wherein the borehole contains a substantially non-conducting fluid therein.

18. The system of claim 11, wherein the processor is configured to calculate a resistivity based on the following equation:

$$R_f = ReZ - \alpha ImZ,$$

wherein "Re Z" is a real part of the impedance, "Im Z" is an imaginary part of the impedance, and $\alpha$ is the correction factor.

19. The system of claim 11, wherein the at least one return electrode is a plurality of return electrodes, and the processor is configured to calculate the correction factor based on a plurality of measurement value pairs, each measurement pair corresponding to one of a plurality of depths.

20. The system of claim 11, wherein the at least one measurement electrode and the at least one return electrode are disposed on a resistivity imager pad.

* * * * *